(12) United States Patent
Sirola et al.

(10) Patent No.: US 6,865,478 B2
(45) Date of Patent: Mar. 8, 2005

(54) DETERMINING THE POSITION OF A RECEIVER AND/OR THE SYSTEM TIME OF A POSITIONING SYSTEM

(75) Inventors: Niilo Sirola, Tampere (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 47 days.

(21) Appl. No.: 10/440,430

(22) Filed: May 16, 2003

(65) Prior Publication Data

US 2003/0236621 A1 Dec. 25, 2003

(51) Int. Cl.$^7$ .............................. G01C 21/00; G01S 5/14
(52) U.S. Cl. ....................... 701/207; 701/213; 701/214; 342/357.06; 342/357.12
(58) Field of Search ................................. 701/207, 209, 701/210, 213, 214, 215; 342/357.01, 357.02, 357.05, 357.06, 357.07, 357.08, 357.12, 357.15, 358; 455/427, 456.1; 370/345; 340/988

(56) References Cited

U.S. PATENT DOCUMENTS

| | | | |
|---|---|---|---|
| 6,115,371 A | * | 9/2000 | Berstis et al. ............... 370/345 |
| 6,191,731 B1 | * | 2/2001 | McBurney et al. .... 342/357.05 |
| 6,204,808 B1 | * | 3/2001 | Bloebaum et al. ..... 342/357.07 |

FOREIGN PATENT DOCUMENTS

| WO | 0058748 | 10/2000 |
|---|---|---|

OTHER PUBLICATIONS

"Possibilities for GPS Time Recovery with GSM Network Assistance", J. Syrjarinne, from the Internet, date is not available.

"The Modernized L2 Civil Signal", R. Fontana et al, *GPS World*, Sep. 2001, pp. 234.

"Efficient Satellite Orbit Approximation", P. Korvenoja et al. from the Internet, date is not available.

"A Method for GPS Positioning without current Navigation Data", N. Sirola, Master of Science Thesis, Tampere University of Technology, Sep. 2001.

"The New L2 Civil Signal", R. Fontana et al, from the Internet, date is not available.

"On Satellite Visibility", N. Sirola, Oct. 22, 2001, from the Internet, date is not available.

"GPS Positioning Can Be Computed without the Navigation Data", N. Sirola et al, *Ion GPS 2002*, Sep. 24–27, 2002, Portland OR, pp. 2741–2744.

"Solving GPS Time and Position with Navigation Data", N. Sirola et al, from the Internet, date is not available.

* cited by examiner

Primary Examiner—Tan Q. Nguyen (57) ABSTRACT

The invention relates to a method for determining in a positioning system the position of a receiver and/or an accurate system time. The receiver receives and tracks code modulated signals transmitted by beacons of the positioning system and comprising a known regularity. In order to enable an improved positioning, it is proposed that the method comprises establishing a grid covering the area 20 of earth which is visible by a plurality of beacons from which said receiver receives and tracks code modulated signals at a specific reference time instance. The method further comprises determining the position of the receiver and/or the system time based on measured code phases of code modulated signals received and tracked by the receiver, on available assistance data and on at least a selected one of the intersection points of the grid as reference location. The invention relates equally to corresponding devices and a positioning system.

28 Claims, 3 Drawing Sheets

DETERMINING THE POSITION OF A RECEIVER AND/OR THE SYSTEM TIME OF A POSITIONING SYSTEM

CROSS REFERENCE TO RELATED APPLICATION

The present application claims priority under 35 U.S.C. § 119 from International Application PCT/IB02/01688 filed May 17, 2002.

FIELD OF THE INVENTION

The invention relates to a method for determining in a positioning system the position of a receiver and/or an accurate system time. The receiver receives and tracks code modulated signals transmitted by beacons of the positioning system, which code modulated signals comprise a component of a known regularity. The invention relates equally to a corresponding receiver, to a device comprising a receiver, to a device capable of communicating with a receiver and to a system comprising at least a receiver and a device capable of communicating with the receiver.

BACKGROUND OF THE INVENTION

A well known positioning system which is based on the evaluation of signals transmitted by beacons is GPS (Global Positioning System). The constellation in GPS consists of more than 20 satellites employed as beacons that orbit the earth. The distribution of these satellites ensures that usually between five and eight satellites are visible from any point on the earth.

Each of the satellites, which are also called space vehicles (SV), transmits two microwave carrier signals. One of these carrier signals L1 is employed for carrying a navigation message and code signals of a standard positioning service (SPS). The L1 carrier phase is modulated by each satellite with a different C/A (Coarse Acquisition) Code. Thus, different channels are obtained for the transmission by the different satellites. The C/A code, which spreads the spectrum over a 1 MHz bandwidth, is repeated every 1023 bits, the epoch of the code being 1 ms. The carrier frequency of the L1 signal is further modulated with navigation information at a bit rate of 50 bit/s, which information comprises in particular ephemeris data. Ephemeris parameters describe short sections of the orbit of the respective satellite. Based on these ephemeris parameters, an algorithm can estimate the position and the velocity of the satellite for any time of about 2–4 hours during which the satellite is in the respective described section. Ephemeris data also comprise clock correction parameters which indicate the current deviation of the satellite clock versus a general GPS time.

Further, a time-of-week (TOW) count is reported every six seconds as another part of the navigation message.

A GPS receiver of which the position is to be determined receives the signals transmitted by the currently available satellites, and a tracking unit of the receiver detects and tracks the channels used by different satellites based on the differently comprised C/A codes. The receiver first determines the time of transmission of the ranging code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits. A detected epoch edge also indicates the code phase of a received signal.

Based on the time of transmission and the measured time of arrival (TOA) of the ranging code at the receiver, the time of flight (TOF) required by the ranging code to propagate from the satellite to the receiver is determined. By multiplying this TOF with the speed of light, to the distance between the receiver and the respective satellite is obtained. The computed distance between a specific satellite and a receiver is called pseudo-range, because the general GPS time is not accurately known in the receiver. Usually, the receiver calculates the accurate time of arrival of a ranging code based on some initial estimate, and the more accurate the initial time estimate is, the more efficient are position and accurate time calculations. A reference GPS time can, but does not have to be provided to the receiver by a network.

The computed distances and the estimated positions of the satellites then permit a calculation of the current position of the receiver, since the receiver is located at an intersection of the pseudo-ranges from a set of satellites. In order to be able to compute a position of a receiver in three dimensions and the time offset in the receiver clock, the signals from four different GPS satellite signals are required.

If navigation data are available on one of the receiver channels, the indication of the time of transmission comprised in a received signal can also be used in a time initialization for correcting a clock error in the receiver. In GPS, an initial time is needed for the positioning. For the initial time estimate, the average propagation time of satellite signal of around 0.078 seconds is added to the time of transmission of a ranging code extracted from the navigation information. The result is used as initial estimate of the time of arrival of a ranging code, which estimate lies within around 20 ms of the accurate time of arrival. The receiver then determines for different satellites the time at which a respective ranging code left the satellite. Using the initial estimate of the current time, the receiver forms pseudorange measurements as the time interval during which the respective ranging code was propagating from the satellite to the receiver either in seconds or in meters by scaling with the speed of light. After the position of the receiver has been calculated from the determined pseudoranges, the accurate time of arrival can then be calculated from standard GPS equations with an accuracy of 1 $\mu$s.

However, in order to be able to make use of such a time initialization, the navigation data from a satellite signal is needed. Currently, most of the GPS receivers are designed for outdoor operations with good signal levels from satellites. Thus, only good propagation conditions ensure that the navigation data required for the described time initialization is available.

In bad propagation conditions, in contrast, it may not be possible to extract the navigation message accurately enough from received satellite signals, since a high bit-error rate and weak signal levels make a robust decoding of navigation bits impossible. Such bad propagation conditions, which are often given indoors, render the time initialization and the pseudorange measurements more difficult.

For those cases in which the standard time initialization methods cannot be applied since the navigation data are noisy, the time initialization process for the receiver can be performed by a time recovery method. Details of a time recovery method have been presented for example in "Possibilities for GPS Time Recovery with GSM Network Assistance", Proceedings of the ION GPS 2000, September 2000, by Syrjärinne J. Such methods, however, usually require a reference position for the receiver.

SUMMARY OF THE INVENTION

It is an object of the invention to enable an improved positioning of a receiver receiving and tracking code modulated signals, which signals are transmitted by beacons of a positioning system and comprise a component of a known regularity, without making use of navigation information in received beacon signals. It is in particular an object to enable a fast determination of the position of a receiver and/or the accurate system time without the need for a reference position.

This object is reached with a method comprising a step of establishing a grid covering the area of earth which is visible by a plurality of beacons from which the receiver receives and tracks code modulated signals at a specific reference time instance. It is further proposed that the method comprises a step of determining the position of the receiver and/or the system time based on measured code phases of code modulated signals received and tracked by the receiver, on available assistance data and on at least a selected one of the intersection points of the grid as a reference location. The intersection points of the grid will also be referred to as grid points in the following.

The object is further reached with a receiver, with an electronic device comprising a receiver or with some other device, either comprising means for carrying out the steps of the proposed method. In case the processing is performed in another unit than the receiver, the required information about the received signals is forwarded by the receiver to this unit. The proposed other device can be for instance a network element of a network. The object is also reached with a system comprising a receiver and a device, in which system either the receiver or the device comprises means for carrying out the steps of the proposed method. In case the receiver performs the processing, the device may provide assistance data to the receiver required in the process of determining the position of the receiver.

The invention proceeds from the consideration that the earth can be covered by a grid in a way that each possible position of a receiver lies within a predetermined distance to the nearest intersection point of the grid, such that the nearest intersection point constitutes a good approximate position for the position of the receiver. Each grid point can be evaluated to determine whether it is currently the nearest grid point for a receiver. The invention further proceeds from the consideration that the evaluation of all grid points covering the entire surface of the earth requires too much processing power and time for an employment in a receiver. Therefore, it is proposed that the grid is restricted to an area in which the receiver necessarily has to lie. This area can be determined reliably as the area which is visible to all those beacons from which the receiver is able to receives signals at a specific instance of time. The area changes over time, but with a reference time having a rather small maximum error, the area can be determined quite accurately. The area covered by e.g., six satellites at a given time instance is considerably smaller than the whole surface of the earth.

It is an advantage of the invention that it enables a determination of a position and system time estimate, but does not require a reference location or the demodulation of navigation messages of the beacon signals. As a result, a positioning in bad signal conditions becomes possible with a reasonable computational load. Compared to a method using a grid covering the entire earth, the required amount of computation is reduced significantly. The invention also allows use of any information by which the position of the grid points can be restricted further, which may result in an additional reduction of the computational load. Such an information could be for example a knowledge of the country in which the receiver is located. If the receiver is located in a small country, then the area of the country can be used for restricting the positioning.

It is further an advantage of the invention that it enables the computation of the position in the receiver or in a device comprising the receiver.

It is also an advantage of the invention that it enables a reduction of the time to first fix, i.e. the time until the first position is determined, compared to the conventional method finding satellites and solving the position based on good signals. Equally, the time for obtaining the system time from a good quality beacon signal can be reduced with the invention. The size of the subframe of a GPS signal, for instance, is 6 s, and the conventional method has to wait until it is received in the receiver for determining the GPS time from the subframe.

It is moreover an advantage of the invention that it enables a reduction of the power consumption compared to the conventional method, since the receiver only has to determine the code phase of received signals and can be switched off in between.

It is equally an advantage of the invention that it is based only on the code phase of received signals, e.g., the C/A code phase of GPS signals, while ephemeris and pseudoranges are not required from received beacon signals. The employed assistance data can be retrieved, e.g., from a network.

Even in clear-signal conditions, the position obtained with the proposed method might be more accurate than the conventional solution, because signals of beacons can be taken into account that would normally be left out due to insufficient signal strength.

Before determining the approximate position of the receiver based on the grid points in the determined visible area, advantageously further grid points are excluded from the calculations. This can be achieved based on several conditions in one or more additional steps.

A first condition for a further restriction is preferably based on the clock error of the receiver. The assumed clock error can be determined for each grid point based on the geometrical distance between the position of the respective grid point and the position of the respective satellite. This assumed clock error is then compared to a predicted clock error. The predicted clock error is calculated based on measurements of the code phase of a respective received code modulated signal, which code phase constitutes an accurate fraction of the correct time. All grid points for which the difference between the assumed clock error and the predicted clock error exceeds a predetermined value can be excluded from further evaluations. The comparison of the assumed and the predicted clock errors is carried out for each point of the grid without calculating the position itself. Moreover, the computation method can be implemented to be rather fast by using approximations. The computations can be realized for example as integer number computations, instead of as floating point number computations. Thus, this approach is suited to lead to a fast exclusion of a large number of grid points from further evaluations.

An additional restriction of the grid points is preferably achieved by a first, rough approach for determining the position of the receiver.

In a preferred embodiment of the invention, this step is based on minimizing a simplified cost function, which cost function evaluates the deviation between predicted and measured code phases. The measured code phase is determined from measurements of the code phase at the receiver and from measurement corrections. The measurement corrections may comprise ionosphere corrections, satellite clock corrections etc. The predicted code phase is determined by the hardware of the receiver based, e.g., on the satellite positions, on the approximate time of travel of signals from the satellites, on a reference time and on a presumably correct position of the receiver. The presumably exact positions can be calculated by a suitable iteration proceeding from the respective grid point. After two or three iteration steps, it shows whether the solution converges and obeys some further conditions, e.g., whether the resulting value of the cost function lies below a predetermined limit. In case the solution does not converge or is not consistent with the further conditions, the calculation is stopped and the concerned grid point is discarded. With this approach, the grid points can be reduced significantly.

Finally, the correct grid point, i.e., the grid point closest to the actual position of the receiver, is determined from the remaining grid points. This can be achieved for instance with a five-dimensional (5D) time recovery method, which is used for calculating the position and the system time for all remaining grid points. The term 5D time recovery method implies that the time recovery has five variables that are to be optimized, i.e., the system time, three dimensions of the position and the clock error.

With the proposed sequence of steps, there could be over 100000 grid points in the beginning, while the exact time recovery only has to be performed for, e.g., 10 grid points. Thus, a considerable amount of unnecessary computation is avoided.

A conventional receiver, which evaluates navigation information extracted from received signals, has to receive at least six seconds of the navigation message before the positioning can commence, while the proposed method can begin as soon as the assistance data is present. Thus, the time-to-first fix achieved with the proposed method may even be smaller than in conventional methods. In addition, a lower power consumption can be achieved, since the receiver employing the proposed method only has to measure the codes, having in GPS a length of one millisecond, as opposed to the whole navigation message.

As indicated above, the calculations required for the method according to the invention can be carried out in the receiver itself or in some unit external to the receiver. In case the receiver is integrated with a mobile terminal like a cellular phone, the calculations could be carried out for example in a network element of a mobile communication network, to which the receiver transmits the required measurement results. Further, any assistance data required for the calculations may be available in the receiver itself or be provided by some external unit. Such provided assistance data can include in particular ephemeris parameters for the satellites from which signals are received, pseudo-range correction parameters and a reference time, which may have a delay of up to a couple of minutes.

Preferably, though not necessarily, the method according to the invention is implemented as software.

The beacons can be in particular, though not exclusively, satellites or a base stations of a network.

Preferably, though not necessarily, the receiver is a GPS receiver and the beacons are GPS space vehicles. The invention can be employed as well for instance in future extended GPS systems with new signals, in particular the planned new L2C (L2 civil) signal and the planned new L5 signal, and in other similar beacon based positioning systems such as Galileo. The L2C signal and the L5 signal are presented for example in the document "The Modernized L2 Civil Signal" in GPS World, September 2001, by Richard D. Fontana, Wai Cheung, and Tom Stansell. These new signals have slightly different code lengths than the L1 signal, which has also an effect on the proposed method. For example, the grid size can be increased, if the code becomes longer.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
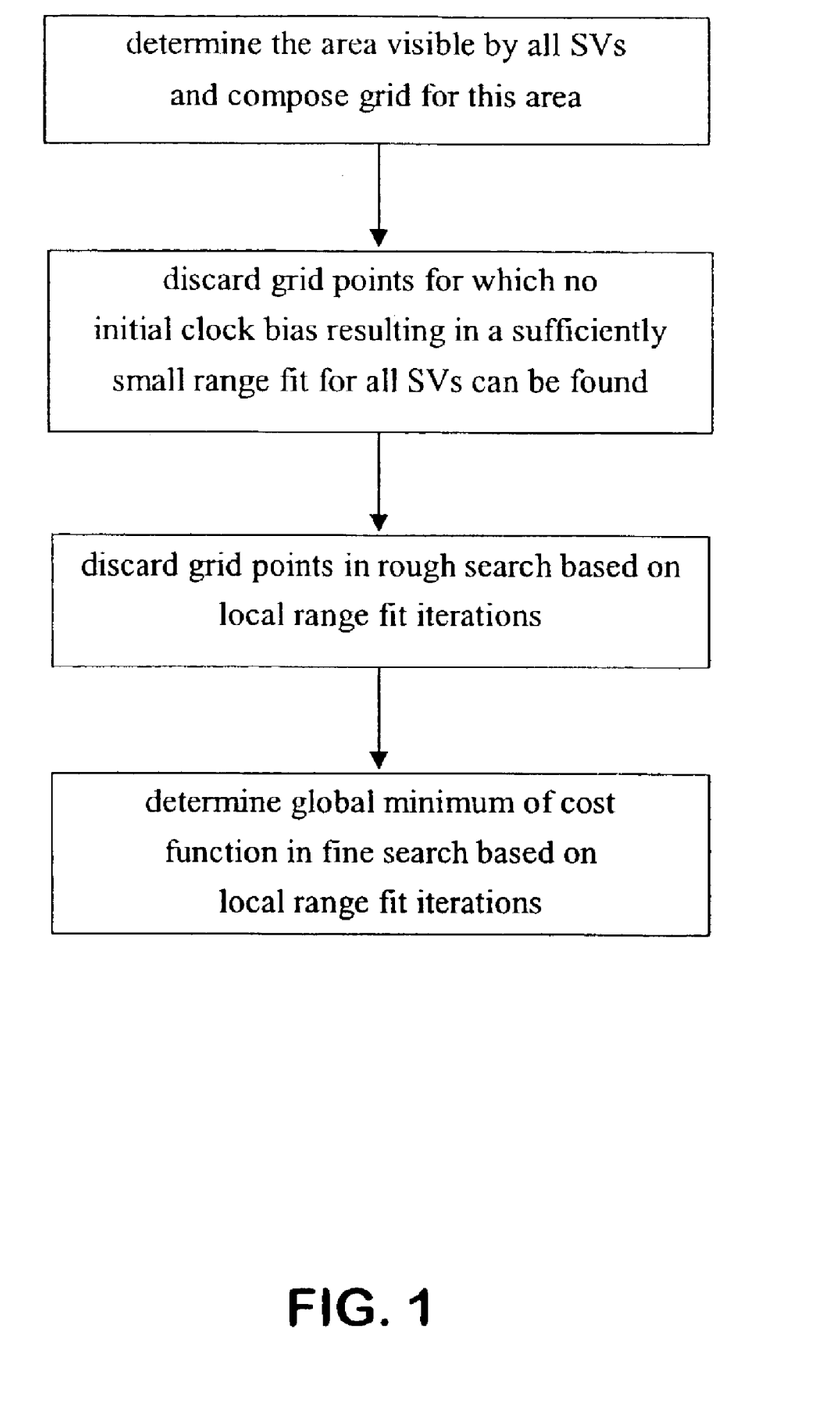
FIG. 1 is a flow chart illustrating a preferred embodiment of the method of the invention.

FIG. 1 is a flow chart depicting the four basic steps of an embodiment of the method according to the invention. The method can be implemented for example as software code in a device comprising a GPS receiver. The receiver receives signals from those GPS satellites which are currently visible to the receiver. The receiver may not be able to extract the navigation message from the received signals due to bad propagation conditions, but it is able to perform C/A code phase measurements on signals received from at least six satellites.

The device has access to a reference time $t_{ref}$, which reference time is delayed 0–60 seconds in comparison to the exact GPS system time. The device has moreover access to ephemeris data of the at least six satellites and to pseudo range correction parameters, e.g., for ionosphere corrections. The assistance data may be available in the device itself, or it may be provided by some unit external to the device. The device comprising the receiver could be for instance a mobile phone, and the assistance data may be provided by a communication network to which the mobile phone is connected.

Before the method of the invention itself is explained, first a local range fitting method will be presented, on the equations of which several of the steps of the method of FIG. 1 are based.

The range fit is a measure of how good the C/A code phase of a satellite signal determined at the receiver fits to a specific selected position. The range fit is defined as:

$$q_i(t, r, b) = \text{frac}_\lambda(\phi_i + \epsilon_i + b - \|s_i(t-\tau_i) - r\|) \quad (1)$$

In this equation, t is the unknown GPS system time at which a signal is received at the receiver, r is the unknown three-dimensional position of the receiver, b is the unknown clock bias at the receiver, $\phi_i$ is the C/A code phase measurement at the receiver for the $i^{th}$ of n satellites in meters, $\epsilon_i$ is a compensation in meters of the approximate error in the C/A code phase measurement for the $i^{th}$ of n satellites, caused for example by the influence of the atmosphere to the propagation of the respective satellite signal and by the earth rotation, $s_i$ (t) is the position of the $i^{th}$ of n satellites at time instant t, $\tau_i$ is the approximate time-of-travel in seconds of a signal from the $i^{th}$ of n satellites to the user, usually about 0.078 s, and $frac_\Lambda$ is a fraction operator determined as:

$$frac_\Lambda x = x - \Lambda \text{ round } \frac{x}{\Lambda},$$

where $\Lambda$ is the C/A code sequence length in meters, which is approximately 300 km.

The argument of $frac_\Lambda$ in equation (1) thus corresponds to the distance between the position of the respective satellite $s_i$ and the position of the receiver r in entire multiples of $\Lambda$, if the assumed position of the receiver is the correct position and if the assistance data is correct. The range fit q constitutes the residual error, i.e. the deviation from this exact multiple of $\Lambda$, in case the assumed position r and/or the assistance data, in particular the assumed time t and the assumed clock bias b, is not quite correct.

Denoting $$x = \begin{bmatrix} t \\ r \\ b \end{bmatrix} \text{ and } q(x) = \begin{bmatrix} q_1(x) \\ \vdots \\ q_n(x) \end{bmatrix},$$

the square of sums cost function is then given by:

$$f(x) = \frac{1}{2} \| q(x) \|^2, \quad (2)$$

This cost function has a global minimum approximately with the values x=(T, R, B), if n>5, where T is the true time of reception of the signals at the receiver, R the true position of the receiver, and B the true clock bias at the receiver.

If moreover initial values $x_0=(t_0, r_0, b_0)$ are known such that $$\kappa \left| T - t_0 \right| + \| R - r_0 \| + \left| B - b_0 \right| < \frac{1}{2}\Lambda, \quad (3)$$

where $\kappa$ is set to about 710 m/s to take account of the maximal possible Doppler effect, then the minimum for the cost function of equation (2) can be reached very efficiently with the following iteration of the local range fit iterative method, when proceeding from these initial values x=($t_0$, $r_0$, $b_0$):

$$x_{k+1} = x_k - [q'(x_k)^T q'(x_k)]^{-1} q'(x_k)^T q(x_k). \quad (4)$$

Since the time is bounded inside one minute, it is recommended for the determination of the position of the satellites to construct the cubic Hermite interpolants of the satellite tracks as described for example by Korvenoja P. and Piché R. in "Efficient Satellite Orbit Approximation, Proceedings of the ION GPS 2000, September 2000." Once the polynomials are calculated, they can be used through the whole procedure. On an interval this short, cubic polynomials give extremely accurate position and velocity estimates, and they are very fast to evaluate.

When the position of a device is to be determined, the device can basically be located at any position on the earth. Each of the four steps presented in FIG. 1 enables one to discard some of these positions.

In a first step of the method illustrated in FIG. 1, the device determines the area on the surface of the earth to which the search for the position of the device can be limited.

The device must be located at a position at which all of the satellites from which signals are received are above the horizon. Correspondingly, the position of the device has to lie in an area which is visible at the same time to all of the satellites from which signals are received. Thus, the position search can be limited to this area.

Figure 2:
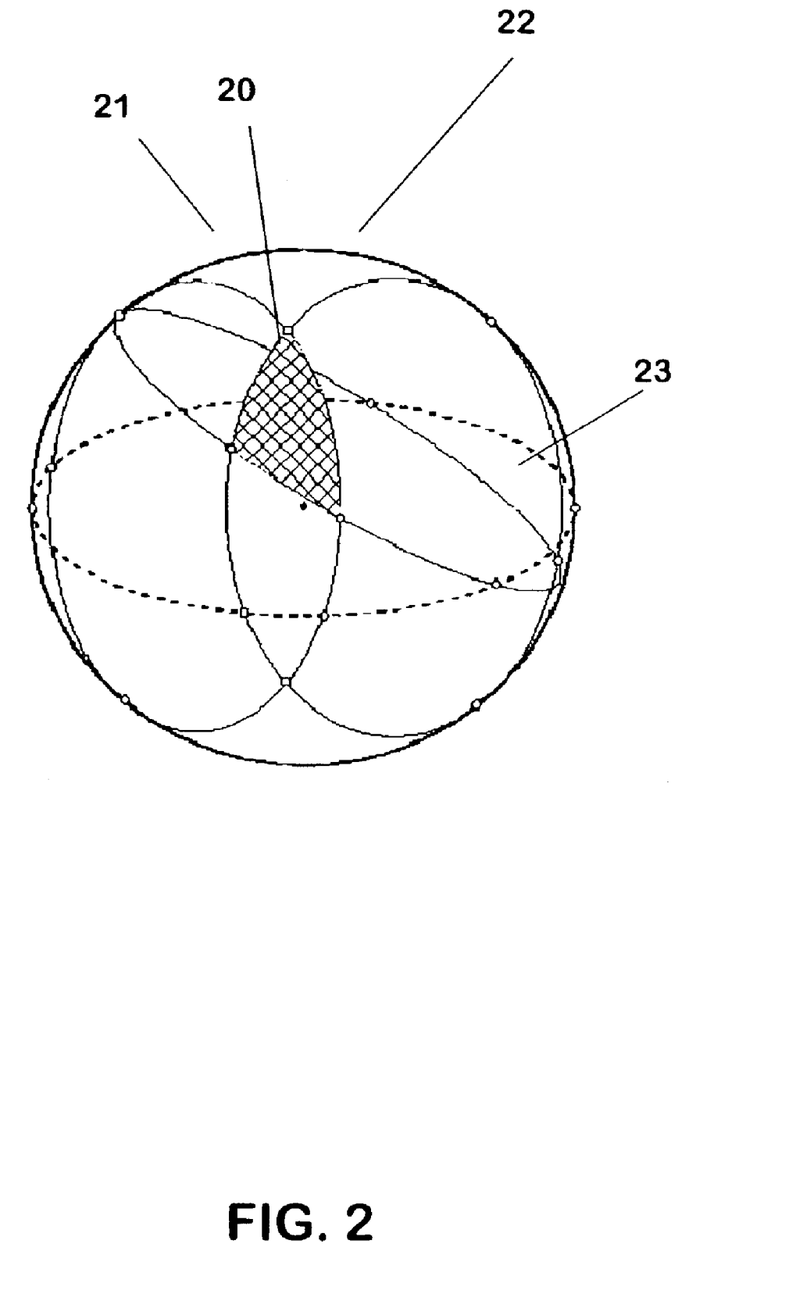
FIG. 2 shows by way of example the visibility area of three satellites at a given point of time.

For illustration, FIG. 2 shows a sphere representing the earth, on which the equator is depicted with a dashed line. The area visible by a satellite is a segment of the earth sphere. The segments visible to a respective one of three satellites are limited in the figure by respective circle lines 21, 22, 23. The receiver has to lie inside the intersection of the three segments to be able to see all of the satellites. The area 20 visible at the same time to all three satellites is indicated in FIG. 2 by a grid. The satellites themselves are not shown in the figure. Obviously, the area 20 will be additionally restricted when considering more satellites, e.g., a further three satellites.

As the satellites move, the visible area naturally changes, but since the true time is assumed to be bounded between $t_{ref}$ and $t_{ref}+60$ s, this change is insignificant.

The point r on the Earth surface belongs to the visible area if and only if $\forall i: s_i^T r \geq r_{Earth}^2$. The visible area is shaped like a polygon with curved edges, and it is possible to analytically solve its vertexes at least approximately.

Once the visible region at a given time instant is determined, e.g., at $t_{ref}+30$ s, a grid is composed which is covering the visible region such that any point inside the visible region lies at the most d meters apart from the nearest grid point. The grid spacing d should be set to a value between 0 and $\Lambda/2$, e.g., to 100 km.

With a grid spacing of d=100 km, there are typically five hundred (500) to three thousand (3000) total grid points in an area visible by six satellites. If the grid is dense enough, then at least one of the grid points satisfies the above inequality (3), and the local range fitting iteration in the above equation (4) converges when proceeding from this grid point.

For every grid point in the visible area, the time and position is now known. During each of the following steps, the grid points are evaluated against some condition in order to be able to discard unsuitable grid points.

In the second step indicated in FIG. 1, the grid points are first reduced based on a determination of an approximate clock bias value.

The approximate clock bias b has to be such that the range fit $q_i$ (x) of equation (1) is sufficiently small for each of the n satellites. Thus, b has to fulfill the following equation:

$$\max_i \left| q_i(t_{ref}, r, b) \right| < \left(\frac{1}{2}\Lambda - q_{tresh}\right). \quad (5)$$

The value $q_{tresh}$ in this equation is an initial fit threshold for the range fit q, which has to be set to a suitable value between 0 and $\Lambda/2$, e.g., to 70 km. If $q_{tresh}$ is set to 0, then any value of b will fulfill the relation and be accepted as possible clock bias value. On the other hand, with $q_{tresh}=\Lambda/2$ no value of b will be accepted.

This second step requires most of the execution time in the described embodiment of the method according to the invention. Therefore, it has to be implemented very efficiently. The condition (5) is checked only for a few clock bias values, the spacing of which is defined with a parameter $\beta$. For example, a suggested value of $\beta=40$ km would yield eight different clock bias values b to check. Assuming eight satellites, this would correspond to about $3000*8*8\approx200\,000$ evaluations of the condition (5) in the worst case. The computation of $q_i(x)$ can be implemented very efficiently if, for example, the square root in the vector norm is approximated with a coarse table-lookup and/or if variables are scaled such that $\Lambda$ maps to some suitable power of 2 so that $frac_\Lambda$ can be calculated with a single AND-command. To compensate for the errors caused by these approximations, $q_{tresh}$ must be decreased accordingly.

If no initial clock bias b can be found for a specific grid point fulfilling equation (5) with the given threshold $q_{tresh}$, it can be concluded that this grid point is not near the true position R. Thus, this grid point is discarded. With a well-chosen threshold value $q_{tresh}$, only about 5% to 10% of the grid points might pass this test of the second step of the method illustrated in FIG. 1.

In the third step, the remaining grid points are further reduced by a rough search based on the equation for the range fitting iteration (4).

The aim of this rough search is to exclude quickly most of the remaining grid points, which are not going to converge to the true position in equation (4), and-can thus not be the basis for the minimum value of the cost function of equation (2).

There are several possibilities to enable a fast exclusion of a large amount of grid points.

For instance, the range fit $q_i(x)$ of equation (1) can be approximated in various ways. This can be achieved, for example, by ignoring the Earth rotation compensation, by using constant values to approximate the pseudo-range corrections, and by using constant times-of-travel compensations in the satellite position calculations.

Further, it will be sufficient to calculate two or three iteration steps of equation (4), since for many grid points the convergence or divergence will be apparent by then. Also a large step in the result from one iteration step to the next in equation (4) indicates a divergence. Each iterate further has to lie within the region defined by equation (3).

After each iteration step, it can moreover be checked whether the altitude of the current position estimate is still between a predetermined lower altitude limit $h_{L1}$ and a predetermined higher altitude limit $h_{H1}$.

Still another possibility for speeding up the exclusion of grid points is to check whether the final value for x for a specific grid point results in a cost function value f(x) which is smaller than a predetermined threshold value $f_{tresh1}$.

Each grid point which does not lead to a convergence in the iteration according to equation (4) or which does not fulfill one of the proposed additional requirements will be discarded in the third step of the method illustrated in FIG. 1.

It has to be noted that the more approximations are used, the looser the altitude and cost function bounds $h_{L1}$, $h_{H1}$ and $f_{tresh1}$ have to be, in order to allow for approximation errors.

In the fourth step of the method illustrated in FIG. 1, the full-precision local range fitting search according to equation (4) is launched for every grid point passing also the coarse evaluation in the third step.

For some of the remaining grid points, the searches will fail to converge in the iteration, and these grid points can be discarded as well.

For most of the remaining grid points, however, the search will produce a local minimum of the cost function of equation (2). Of these grid points, all those are discarded in addition which result in a minimum of the cost function exceeding a further predetermined value $f_{tresh2}$, or which have an altitude which does not lie between a further predetermined lower limit $h_{L2}$ and a further predetermined upper limit $h_{H2}$.

In the ideal case, only a single grid point is left now, and this grid point is taken as the desired time-position-bias solution.

If several grid points fulfilling all the requirements are found, they are probably almost equal to each other, and result from iterations starting from different starting points near the global minimum. In this case, one of the grid points can be picked as the final solution and the others be ignored.

If, however, multiple separate solutions were acquired or no grid point at all satisfied all the conditions, the positioning failed. In order to achieve nevertheless a result, the employed parameters of the method can be modified for a new search.

It can be assumed for instance that the true position was missed because of a too sparse search grid. In this case, the parameters d, $\beta$ and $q_{tresh}$ can be reduced and the search started again.

Further, the reference time might be delayed more than expected. In this case, the search can be performed again with the interval $[t_{ref}+60\,s, t_{ref}+120\,s]$.

It can moreover be assumed that the reference time was incorrect or that there was no reference time at all. In this case, the time interval during which the visible region is non-empty can be determined. This time interval is about 30 min to 3 hours, depending on the number of satellites. The determined time interval is then divided into pieces of one minute each, and the search is carried out again with each one of the pieces until a suitable grid position is found.

Basically, the method runs faster with large values of d, $\beta$ and $q_{tresh}$. However, too large values will cause failures in the positioning, as mentioned above. The choice of optimal values, i.e., those that give the fastest position fixes in most cases without compromising reliability, depends on various factors, e.g., on the number of satellites used, on the maximum allowed error in the reference time, on the amount of measurement noise, on rounding errors in the calculations and, as for the execution time, on the actual implementation. With the assumed values of d=100 km, $\beta=40$ km, and $q_{tresh}=70$ km a success can be expected according to simulations in 99.5% of the cases.

In an alternative embodiment of the method according to the invention, steps two to four of FIG. 1 are not completed for all respectively remaining grid points before passing to the next step. Instead, each grid point runs through steps two to four before the next grid point is evaluated. This will save some processing time, especially if the true position is found among the very first points processed.

The method according to the invention can be supported by additional information, if such information is available.

In case a position information is available, it can be exploited in the second embodiment of the invention by checking the nearby grid points first. For example, if a the position of the device two hours ago is known, it is reasonable to assume that the device is within couple of hundreds of kilometers from that point. Thus, this region should be searched first. Also a knowledge of the country in which the user is located allows to rule out "impossible" grid points in the first place.

Figure 3:
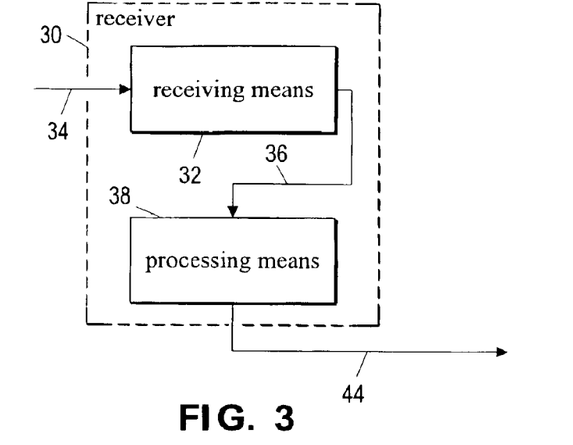
FIG. 3 shows a receiver according to the present invention.
Figure 4:
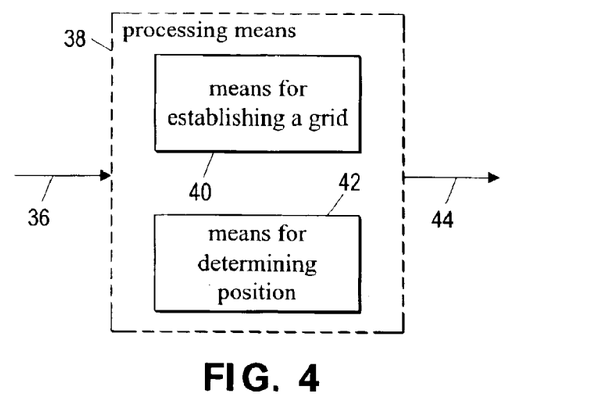
FIG. 4 shows the processing means of FIG. 3.

FIG. 3 shows a receiver 30 including receiving means 32 responsive to code modulated signals on a line 34 from beacons of a positioning system, which signals have a known regularity. The means for receiving 32 is for receiving and tracking the code modulated signals received on the line 34. After receiving and tracking the code modulated signals, the receiving means provides the received and tracked code modulated signals on a line 36 to processing means 38 that carries out the method described above in connection with FIG. 1. It will be understood by those of skill in the art that the processing means 38 may be carried out in hardware, software, or a combination thereof. For instance, if the processing means 38 is a signal processor with software, a selected software language would be used and code written and stored in a computer readable medium within the processing means which would also include a central processing unit, various types of memory means including random access memory and read only memory for instance and various other components including input/output ports, control, address and data busses, a clock, a power supply, etc. If carried out in hardware, the processing means may be embodied in an integrated circuit in the form of a digital signal processor, an application specific integrated circuit, etc. The processing means 38 of FIG. 3 may be further illustrated in FIG. 4 as including means 40 for establishing a grid such as is carried out in the first step of FIG. 1 and means 42 for determining position and/or an accurate system time as is carried out in the rest of the steps of the present invention. Finally, the processing means provides an output signal on a line 44 indicative of at least one of a position of the receiver and an accurate system time.

Figure 5:
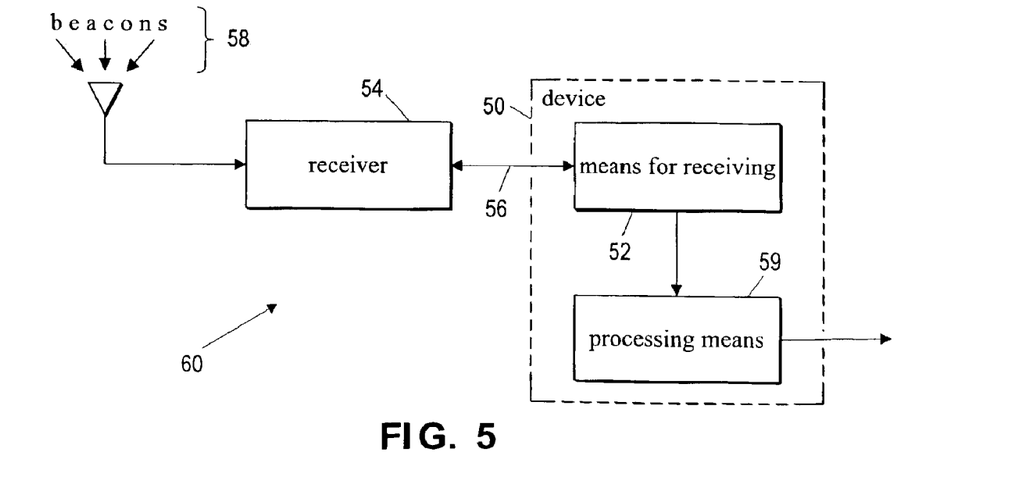
FIG. 5 shows the invention embodied in a device coupled to a receiver in a system according to the invention.

The invention may also be embodied in a device 50 as shown in FIG. 5 including means 52 for receiving from a receiver 54 information on a line 56 indicative of code modulated signals 58 transmitted by beacons of a positioning system and received, e.g., via an antenna and tracked by the receiver 54. These signals 58 are of a known regularity. The device 50 may also include processing means 59 which fulfills a function similar to the processing means 38 of FIGS. 3 and 4, according to the present invention, already described above in connection with carrying out the steps of FIG. 1. The device 50 could be a network element of a network, for instance. In that case, the various elements of FIG. 5 could together constitute a positioning system 60 comprising at least one receiver 54 for receiving the code modulated signals transmitted by beacons and having a known regularity and for providing information on the line 56 on these received code modulated signals to a network element device 50 of the positioning system 60 such as described above. The device 50 could be for providing assistance data to the receiver in the reverse direction back on the line 56 for enabling the receiver to determine its position and/or an accurate system time. In that case, the receiver 54 would be like the receiver 30 of FIG. 3 and the device 50 would be a network element of the network.

It is to be noted that the described embodiments can be varied in many ways within the scope of the invention.

What is claimed is:

1. Method for determining at least one of a position of a receiver and an accurate system time, which receiver receives and tracks code modulated signals transmitted by beacons of said positioning system and comprising a component of a known regularity, said method comprising the steps of:

establishing a grid covering an area (20) of earth which is visible by a plurality of beacons from which said receiver receives and tracks code modulated signals at a specific reference time instance; and determining at least one of the position of said receiver and the system time based on measured code phases of code modulated signals received and tracked by said receiver, on available assistance data and on at least a selected one of the intersection points of said grid as reference location.

2. Method according to claim 1, wherein said plurality of beacons comprises at least six beacons.

3. Method according to claim 1, wherein the area (20) covered by said grid is further reduced by an information on the position of the receiver.

4. Method according to claim 1, wherein those intersection points are excluded from being used as reference position, for which intersection points the difference between on the one hand an assumed clock error determined based on the geometric distance between a respective intersection point and any of said plurality of beacons and on the other hand a clock error predicted for the respective satellite based on said measured code phases exceeding a predetermined value.

5. Method according to claim 1, wherein unsuitable intersection points are excluded from use as a reference position, which unsuitable intersection points are determined based on a simplified approach for determining the position of the receiver.

6. Method according to claim 5, wherein said simplified approach is a simplified five-dimensional time recovery method.

7. Method according to claim 5, wherein said simplified approach comprises minimizing a cost function, which cost function comprises at least one residual error depending on a respective reference position as argument.

8. Method according to claim 7, wherein said simplified approach comprises an iteration with at the most three iteration steps for determining at least for selected intersection points of said grid a refined reference position that might result in a minimum in said cost function.

9. Method according to claim 8, wherein intersection points are considered as unsuitable intersection points, in case they result in diverging refined reference positions in said iteration.

10. Method according to claim 8, wherein intersection points are considered as unsuitable intersection points, in case they result in two consecutive iteration steps in refined reference positions with a difference to each other which exceeds a predetermined difference.

11. Method according to claim 8, wherein intersection points are considered as unsuitable intersection points, in case they result in one of said iteration steps in a refined reference position corresponding to an altitude exceeding a first predetermined altitude or lying below a second predetermined altitude.

12. Method according to claim 8, wherein intersection points are considered as unsuitable intersection points in case they result after a predetermined number of iteration steps in a refined reference position which leads to a value of said cost function which value exceeds a predetermined value.

13. Method according to claim 7, wherein said simplified approach comprises minimizing an approximated cost function based on an iteration for determining at least for selected intersection points a refined reference position for said cost function.

14. Method according to claim 1, wherein at least one of the position of said receiver and said system time is determined based on a five-dimensional time recovery method using selected intersection points of said grid as a reference position.

15. Method according to claim 1, wherein at least one of the position of said receiver and said system time is determined by minimizing a cost function, which cost function comprises at least one residual error depending on a respective reference position as argument.

16. Method according to claim 15, wherein said cost function is minimized for refined reference positions, which refined reference positions are determined by a converging iteration proceeding from a respective reference position given by a selected intersection point of said grid.

17. Method according to claim 16, wherein it is checked whether a specific intersection point is to be excluded as basis for determining the position of said receiver due to any of predetermined conditions, before it is checked whether a respective further intersection point is to be excluded as basis for determining at least one of the position of said receiver and said system time.

18. Method according to claim 17, wherein the order of checking said intersection points is determined based on available information on the position of said receiver.

19. Method according to claim 1, wherein said method is repeated with changed assistance data, in case said at least one of said position of said receiver and said system time is not obtained with said available assistance data.

20. Receiver comprising
   receiving means for receiving and tracking code modulated signals from beacons of a positioning system, which signals comprise a known regularity; and
   processing means for carrying out the method according to claim 1.

21. Receiver according to claim 20, which receiver is a GPS receiver.

22. Electronic device comprising a receiver according to claim 20.

23. Electronic device according to claim 22, wherein said electronic device is a mobile terminal capable of connecting to a network.

24. Positioning system comprising
   a receiver according to claim 20; and
   a device for providing assistance data to said receiver for enabling said receiver to determine at least one of its position and a system time.

25. Positioning system according to claim 24, wherein said device is a network element of a network.

26. Device comprising
   means for receiving from a receiver information on code modulated signals transmitted by beacons of a positioning system and received and tracked by said receiver, which signals comprise a known regularity; and
   processing means for carrying out the method according to claim 1.

27. Device according to claim 26, which device is a network element of a network.

28. Positioning system comprising
   a receiver comprising means for receiving code modulated signals transmitted by beacons and comprising a known regularity, and means for providing information on received code modulated signals; and
   a device according to claim 26.

* * * * *

UNITED STATES PATENT AND TRADEMARK OFFICE
CERTIFICATE OF CORRECTION

PATENT NO. : 6,865,478 B2
DATED : March 8, 2005
INVENTOR(S) : Sirola et al.

It is certified that error appears in the above-identified patent and that said Letters Patent is hereby corrected as shown below:

<u>Title page,</u>
Insert item -- [30] Foreign Application Priority Data
               May 17, 2002    (WO)    PCT/IB02/01688 --.

Signed and Sealed this

Sixteenth Day of August, 2005

JON W. DUDAS
*Director of the United States Patent and Trademark Office*